United States Patent
Ruiz Gomez et al.

(10) Patent No.: US 8,461,229 B2
(45) Date of Patent: Jun. 11, 2013

(54) HEAT-STABLE ENCAPSULATED PIGMENTS

(75) Inventors: Gloria Ruiz Gomez, Hésingue (FR); Thomas Ruch, Delémont (CH); Christine Price, Riehen (CH)

(73) Assignee: BASF SE, Ludwigshafen (DE)

( * ) Notice: Subject to any disclaimer, the term of this patent is extended or adjusted under 35 U.S.C. 154(b) by 553 days.

(21) Appl. No.: 12/446,250

(22) PCT Filed: Oct. 15, 2007

(86) PCT No.: PCT/EP2007/060944
§ 371 (c)(1),
(2), (4) Date: Apr. 20, 2009

(87) PCT Pub. No.: WO2008/049749
PCT Pub. Date: May 2, 2008

(65) Prior Publication Data
US 2010/0324216 A1    Dec. 23, 2010

(30) Foreign Application Priority Data
Oct. 25, 2006 (EP) .................................... 06122940

(51) Int. Cl.
*C08K 5/3417* (2006.01)
*C08K 5/3465* (2006.01)
*C08K 9/04* (2006.01)

(52) U.S. Cl.
USPC ............. 523/202; 523/205; 523/206; 524/89; 524/92; 524/720

(58) Field of Classification Search
USPC ................ 523/202, 205, 206; 524/89, 92, 94, 524/100
See application file for complete search history.

(56) References Cited

U.S. PATENT DOCUMENTS

| | | | |
|---|---|---|---|
| 3,393,162 A | 7/1968 | Cox et al. | |
| 3,598,801 A | 8/1971 | Beffa et al. | |
| 3,826,670 A | 7/1974 | Rees | |
| 4,370,431 A | 1/1983 | Lienhard et al. | |
| 5,271,769 A | 12/1993 | Bugnon et al. | |
| 5,274,010 A | 12/1993 | Bugnon et al. | |
| 5,401,780 A | 3/1995 | Bugnon et al. | |
| 5,905,111 A | 5/1999 | Leugs et al. | |
| 5,990,230 A | 11/1999 | Muramatsu et al. | |
| 6,288,142 B1 | 9/2001 | Bugnon et al. | |
| 6,294,592 B1 | 9/2001 | Herrmann et al. | |
| 6,395,805 B1 | 5/2002 | Takao | |
| 6,800,127 B2 | 10/2004 | Babler | |
| 7,081,540 B2 * | 7/2006 | Lenz et al. | 548/452 |
| 2003/0177943 A1 * | 9/2003 | Auweter et al. | 106/31.28 |
| 2003/0195274 A1 | 10/2003 | Nakamura et al. | |
| 2004/0106703 A1 * | 6/2004 | Etzrodt et al. | 523/330 |
| 2004/0136933 A1 | 7/2004 | Mistry et al. | |
| 2006/0181878 A1 | 8/2006 | Burkholder | |
| 2009/0069467 A1 | 3/2009 | Gomez et al. | |

FOREIGN PATENT DOCUMENTS

| | | |
|---|---|---|
| EP | 0046729 | 3/1982 |
| EP | 0466646 | 1/1992 |
| EP | 0528602 | 2/1993 |
| EP | 0744448 | 11/1996 |
| FR | 1551400 | 12/1968 |
| WO | 0174735 | 10/2001 |
| WO | 02090445 | 11/2002 |
| WO | 2006089033 | 8/2006 |
| WO | 2006111493 | 10/2006 |

* cited by examiner

*Primary Examiner* — Kriellion Sanders
(74) *Attorney, Agent, or Firm* — Tyler A. Stevenson

(57) ABSTRACT

Engineering plastics, especially polyamide, are coloured with improved fastness and stability properties using pigment compositions comprising an organic pigment wholly overlaid with a crosslinked (meth)acrylic resin or copolymer thereof. Preference is given to the use of diketopyrrolopyrrole, azo, pteridine, isoindoline and isoindolinone pigments. Processes for the preparation of the pigment compositions are also claimed.

7 Claims, No Drawings

HEAT-STABLE ENCAPSULATED PIGMENTS

The present invention relates to novel pigment compositions, to processes for the preparation thereof and to the use thereof for producing coloured engineering plastics (thermoplastics that maintain dimensional stability and most mechanical properties above 100° C. or below 0° C.), especially those based on polyamide.

Mass-colouring of polymer processed at high temperatures, such as engineering plastics and in particular polyamides is usually carried out using so-called solvent dyes, which are soluble in the polyamide mass at high processing temperatures and which, besides having the requisite high heat resistance, also have adequate chemical stability with respect to, for example, the highly reductive medium of the polyamide melt. However, soluble dyes generally have much poorer lightfastness, as compared with pigments.

The use of pigments in such polymers is restricted almost exclusively to inorganic pigments, most of which contain heavy metals, and to a very small selection of specific organic pigments, mainly from the phthalocyanine or quinacridone class. Inorganic pigments, however, have generally low chroma and low colour strength. Organic pigments have disadvantages such as crystal phase and colour changes, migration, a frequent tendency of the coloured materials to fluoresce, and often a reactive interaction with the polymer, leading to degradation of the pigment and/or deterioration of the polymer's mechanical properties.

There is therefore a need for new colourants which in mass-coloured engineering plastics processed at high temperature result in highly saturated, strongly coloured, non-fluorescent colourations that are light-fast and have high-temperature stability, and which exhibit good allround fastness properties, without affecting negatively the physical properties of the polymeric material.

FR 1 551 400 and EP 0 046 729 disclose azopyrimidine colourants. EP 0 061 426 discloses diketopyrrolopyrrole pigments. WO 98/18 866 discloses pteridine pigments.

U.S. Pat. No. 3,826,670 discloses encapsulated pigments with an intermediate ionically crosslinked polymeric salt and a skin consisting essentially of dense, amorphous, hydrated oxide or hydroxide of silicon, titanium or zirconium.

EP 0 744 448 discloses pigments suitable for stencil inks, which are encapsulated in a polymeric matrix obtained from the reaction of polyisocyanates with polyols.

WO 2006/089 933 discloses aqueous dispersions comprising pigments that are at least partially sheathed in radiation-curable polyurethane, their production and use especially for inkjet printing.

U.S. Pat. No. 5,905,111 discloses a continuous process for preparing acrylate based pigment preparations. However, such pigment preparations do not provide satisfactory results in engineering plastics.

U.S. Pat. No. 6,800,127 discloses pigment preparations comprising polyamide particles with an average size of below 50 µm and an average pigment size below 0.2 µm. However, especially the fastness properties are still not fully satisfactory.

WO 06/111 493 is a patent application according to Art. 54(3) EPC and Rule 64.3 PCT, which is directed to pigments encapsulated by polymers which are not crosslinked.

It has now been found that the pigment compositions according to the invention surprisingly meet the above-mentioned criteria to a larger extent.

The present invention accordingly relates to a pigment composition comprising solid particles, which particles comprise from 20 to 75% by weight of an organic pigment and from 80 to 25% by weight of a crosslinked polymer, preferably from 25 to 60% by weight of an organic pigment and from 75 to 40% by weight of a crosslinked polymer, each based on the total weight of the solid particles, wherein the surface of the solid particles consists essentially of the crosslinked polymer and the crosslinked polymer is obtainable from a crosslinking agent and a prepolymer of average molecular weight $M_w$ from 2000 to 200000, preferably from 25000 to 150000, most preferred from 80000 to 125000, which prepolymer comprises (a) repeating blocks of formula

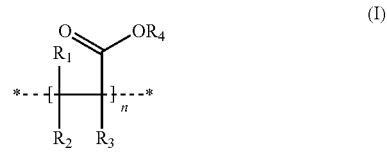

(I)

and (b1) hydroxy, epoxy or primary or secondary amino groups or (b2) unsaturated bonds, wherein $R_1$ is H, $C_1$-$C_4$alkyl, $C_2$-$C_4$alkenyl or $COOR_5$, $R_2$ and $R_3$ are independently from one another H, $OR_6$, $NHR_6$, $C_1$-$C_4$alkyl or $C_2$-$C_4$alkenyl, $R_4$, $R_5$ and $R_6$ are independently from one another H, unsubstituted $C_1$-$C_6$alkyl or $C_2$-$C_6$alkenyl, or $C_2$-$C_6$alkyl or $C_2$-$C_6$alkenyl each substituted by one or more hydroxy and/or epoxy groups, and n is a number from 2 to 2000, preferably from 5 to 1500.

The organic pigment is either directly embedded in the crosslinked polymer, or it is chemically or physically surface-modified or encapsulated, for example with a pigment derivative, a polymer or a layer of one or more transition metal oxides adsorbed on or bound to its surface. However, the pigment and any optional additional components should be fully surrounded by crosslinked polymer, as the surface of the solid particles should consist essentially of the crosslinked polymer, in order the desired properties to be obtained.

The prepolymers are most suitably homo- or copolymers based on unsaturated monomers selected from the group consisting of acrylic acid, methacrylic acid, maleic acid and their derivatives, such as esters and amides thereof and maleic acid anhydride, which monomers may be copolymerized with less polar monomers such as vinyl chloride, vinyl alcohol or preferably styrene. Preferably, the prepolymers comprise at least 30% by weight of repeating blocks of formula (I).

These prepolymers are crosslinked with any known crosslinking agent, for example reactive crosslinking agents such as polyisocyanates, polyhydrazides, poly-carboxylic acids, polyoxazolines, polyaziridines, polyepoxides, polysulfonazides, polyketimines, melamine-formaldehyde resins, urea-formaldehyde resins, or with crosslinking agents forming salts for example with carboxy groups of the prepolymer, such as polyamines or metal ions. Polyfunctional crosslinking agents comprise generally from 2 to 10, preferably 2, 3 or 4, especially 2 functional groups.

A particularly preferred aspect of the invention, however, is the use of self crosslinking prepolymers, which comprise both crosslinkable and crosslinking groups such as described above. The crosslinkable and crosslinking groups may be on the same backbone, optionally as blocks of a copolymer, or also on different backbones imbricated together.

Suitable prepolymers are known and a large choice thereof is available commercially, too. Suitable prepolymers are for example disclosed in WO 01/74 735. Commercially available self crosslinking prepolymers are for example Acronal® LR 8977, Acronal® S 760 na (both BASF AG, Ludwigshafen/DE) and Glascol® C 44 (CIBA Specialty Chemicals Inc.).

The amount of crosslinking agent is generally from 1 to 25% by weight, based on the amount of prepolymer. When the crosslinking agent is separately added to the prepolymer, its amount is preferably from 2 to 20% by weight, most preferably from 3 to 10% by weight, based on the amount of prepolymer. When the crosslinking agent is physically comprised in a self crosslinking prepolymer, its amount is preferably from 1 to 20% by weight, most preferably from 4 to 10% by weight, based on the amount of prepolymer. When the crosslinking agent is part of a self crosslinking prepolymer backbone, the amount of monomers comprising self crosslinking groups used to make the prepolymer is preferably from 1 to 20% by weight, most preferably from 4 to 10% by weight, based on the total amount of monomers used to make the prepolymer.

Crosslinking reactions are known in the art of coatings (see for example Ullmann's Encyclopedia of Industrial Chemistry, Paints and Coatings, 2. Types of Paints and Coatings (Binders), Wiley-VCH Verlag GmbH & Co. KGaA, 6$^{th}$ Edition 2002). The crosslinking reaction can take place simply at room temperature, such as in the case of aqueous acrylic prepolymer dispersions to which bishydrazides or aziridines are subsequently added, or at elevated temperature, such as from 50 to 300° C., especially from 130 to 200° C., optionally in the presence of a suitable catalyst, for example acids, metal compounds, amines, ammonium or hydroxy ions, such as hydrochloric acid, dibutyl tin laurate, triethylamine or tetrabutylammonium iodide.

The instant pigment compositions generally comprise pigment particles having a size of from 0.01 to 10 μm, preferably up to 5 μm, most preferred from 0.05 to 2 μm, especially from 0.1 to 1 μm. The capsules comprising the pigment preferably have an average volume from $10^{-20}$ to $10^{-8}$ m$^3$, especially from $10^{-18}$ to $10^{-10}$ m$^3$.

The instant pigment compositions comprise adequately from 0 to 20% by weight of other components, preferably from 0 to 3% by weight of volatile components, most preferred up to 2% by weight of volatile components, based on the total pigment composition. The volatile components preferably consist of organic solvents or water, most preferred water.

Any organic pigment can be used, for example diketopyrrolopyrrole, quinacridone, azo, quinophthalone, phthalocyanine, indanthrone, flavanthrone, pyranthrone, anthraquinone, perylene, dioxazine, perinone, thioindigo, isoindolinone, isoindoline, pteridine and metal complex pigments.

However, preference is given to the use of diketopyrrolopyrrole, azo, pteridine, isoindoline and isoindolinone pigments, especially pyrrolo[3,4-c]pyrroles of the formula

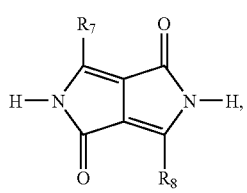

(II)

wherein $R_7$ and $R_8$ are each independently of the other a group of formula

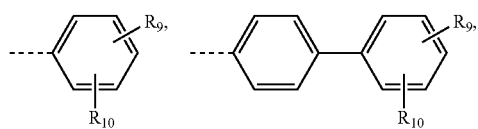

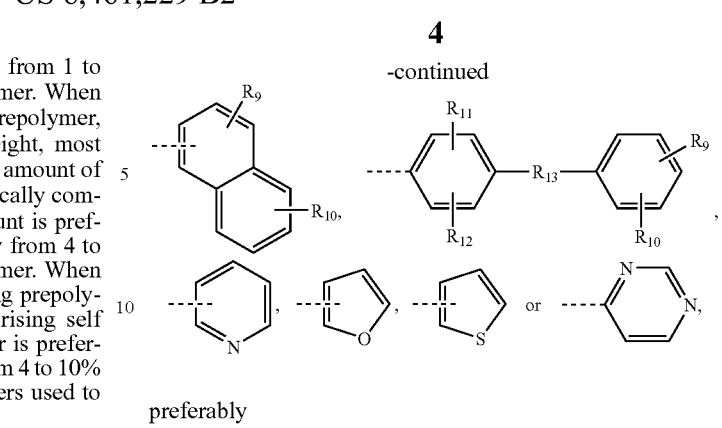

preferably

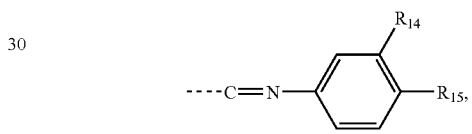

$R_9$ and $R_{10}$ are each independently of the other hydrogen, halogen, $C_1$-$C_{24}$alkyl, trifluoromethyl, $C_5$-$C_6$cycloalkyl, $C_1$-$C_{18}$alkoxy, $C_1$-$C_{18}$alkylthio, $C_1$-$C_{18}$alkylamino, cyano, carbamoyl, nitro, phenyl, . . . C=N—$C_1$-$C_{24}$alkyl,

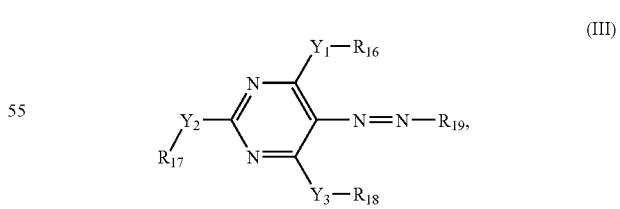

imidazolyl, pyrazolyl, triazolyl, piperazinyl, pyrrolyl, oxazolyl, benzoxazolyl, benzothiazolyl, benzimidazolyl, morpholinyl, piperidinyl or pyrrolidinyl, preferably hydrogen, halogen, cyano, carbamoyl, nitro, trifluoromethyl, phenyl, $C_1$-$C_6$alkyl, $C_1$-$C_6$alkoxy, $C_1$-$C_6$alkylthio or $C_1$-$C_6$alkylamino;

$R_{11}$ and $R_{12}$ are each independently of the other hydrogen, halogen or $C_1$-$C_6$alkyl;

$R_{13}$ is —CH$_2$—, —CH(CH$_3$)—, —C(CH$_3$)$_2$—, —CH=N—, —N=N—, —O—, —S—, —SO—, —SO$_2$—, NH or —NC$_1$-$C_6$alkyl-; and $R_{14}$ and $R_{15}$ are each independently of the other hydrogen, halogen, $C_1$-$C_6$alkyl, $C_1$-$C_6$alkoxy or CN;

azopyrimidines of formula (III)

$$\text{structure}$$

wherein $R_{16}$, $R_{17}$ and $R_{18}$ are independently from one another hydrogen; $C_1$-$C_6$alkyl, $C_3$-$C_6$cycloalkyl, benzyl or phenyl each unsubstituted or substituted by halogen, OH, OR$_{26}$, COR$_{26}$, SR$_{26}$, SO$_2$R$_{26}$, SO$_3$R$_{26}$, CN, COOH, COO$^{-+}$M$_1$, COOR$_{26}$, CONH$_2$, CONHR$_{26}$ or CONR$_{26}$R$_{27}$, preferably $R_{16}$, $R_{17}$ or $R_{18}$ are hydrogen, most preferred $R_{16}$, $R_{17}$ and $R_{18}$ are all hydrogen;

$R_{19}$ is

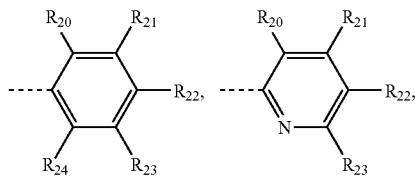
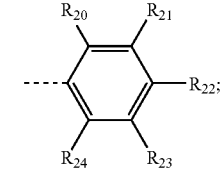
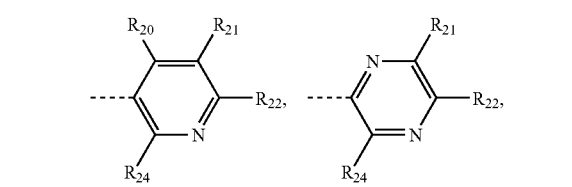
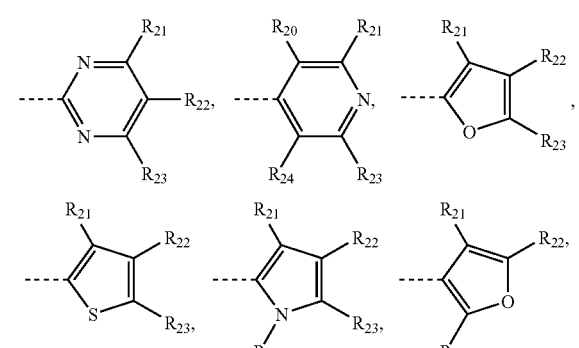
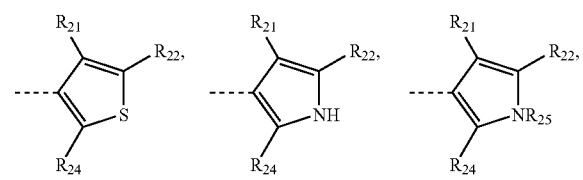
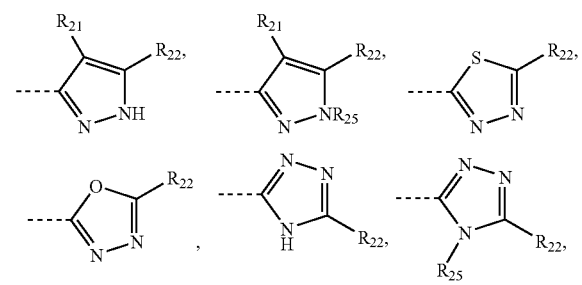
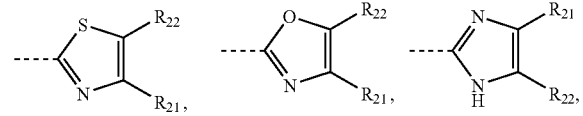
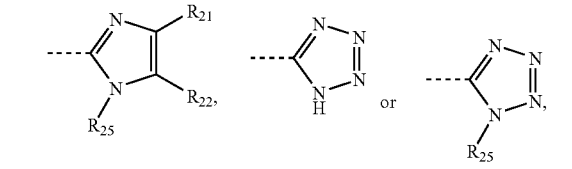

preferably

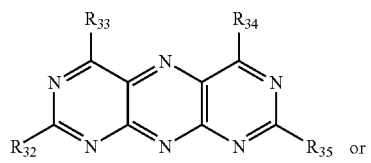

$R_{20}$, $R_{21}$, $R_{22}$, $R_{23}$ and $R_{24}$ are independently from one another hydrogen, halogen, $SO_3H$, $SO_3^{-+}M_1$, $SO_3R_{26}$, $SO_2R_{26}$, $SO_2NH_2$, $SO_2NHR_{26}$, $SO_2NR_{26}R_{27}$, COOH, $COO^{-+}M_1$, $COOR_{26}$, $CONH_2$, $CONHR_{26}$, $CONR_{26}R_{27}$, CN, $NO_2$, $OCOR_{26}$, $NHCOR_{27}$, $NR_{26}COR_{27}$, $R_{26}$, OH, $OR_{26}$, $SR_{26}$, $NH_2$, $NHR_{26}$ or $NR_{26}R_{27}$;

or $R_{20}$ and $R_{21}$ or $R_{21}$ and $R_{22}$ are together as a pair NHCONH, CONHCO or butadienylen which is unsubstituted or substituted by $R_{26}$ and/or $R_{27}$;

$R_{25}$ is H or $R_{26}$; or $R_{25}$ forms together with $R_{22}$ or $R_{24}$ a 5- or 6-membered saturated or unsaturated ring; and $R_{26}$ and $R_{27}$, each independently from any other $R_{26}$ or $R_{27}$, are $C_1$-$C_6$alkyl, $C_3$-$C_6$cycloalkyl, benzyl or phenyl each unsubstituted or substituted by one or more halogen, OH, $OC_1$-$C_5$alkyl, $COC_1$-$C_5$alkyl, CN, $NO_2$, $COOC_1$-$C_5$alkyl, COOH, $COO^{-+}M_1$, $CONH_2$, $CONHC_1$-$C_5$alkyl, $CON(C_1$-$C_5$alkyl$)_2$, $SO_3C_1$-$C_5$alkyl, $SO_3H$ or $SO_3^{-+}M_1$;

$M_1^+$ is $Li^+$, $Na^+$, $K^+$, $\frac{1}{2}Ca^{2+}$, $\frac{1}{2}Sr^{2+}$, $\frac{1}{2}Ba^{2+}$, $\frac{1}{2}Co^{2+}$, $\frac{1}{2}Cu^{2+}$, $\frac{1}{2}Ni^{2+}$, $\frac{1}{2}Mn^{2+}$, $\frac{1}{2}Mg^{2+}$, $\frac{1}{2}Zn^{2+}$, $\frac{1}{3}Al^{3+}$, $\frac{1}{2}TiO^{2+}$, $\frac{1}{2}ZrO^{2+}$, or $^+NR_{28}R_{29}R_{30}R_{31}$, wherein $R_{28}$ to $R_{31}$ are each independently of the others hydrogen; benzyl or $C_1$-$C_{24}$alkenyl which are each unsubstituted or optionally substituted by hydroxy; $[C_2$-$C_4$alkylene-O$]_mH$ or $[C_2$-$C_4$alkylene-O$]_mR_{26}$, wherein m is a number from 1 to 8, or $R_{31}$ is $C_2$-$C_{12}$alkylene linking two identical or different . . . $^+NR_{28}R_{29}R_{30}$ groups;

and $Y_1$, $Y_2$ and $Y_3$ are independently from one another O or preferably NH, most preferred two or all three of $Y_1$, $Y_2$ and $Y_3$ are NH;

pyrimidopteridines of formula

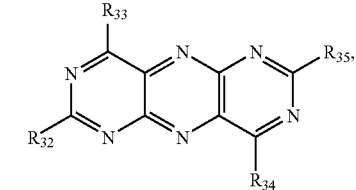

(IV)

or (V)

wherein $R_{32}$, $R_{33}$, $R_{34}$ and $R_{35}$ are each independently of one another $NH_2$, OH, hydrogen, $C_1$-$C_4$alkyl, $NHR_{36}$, $N(R_{36})_2$ or

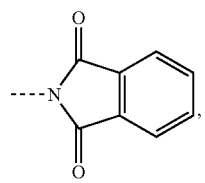

or phenyl, biphenyl or naphthyl which are each unsubstituted or substituted by halogen, OH, $NH_2$, $C_1$-$C_4$alkyl or $C_1$-$C_4$alkoxy, preferably $NH_2$, OH, hydrogen, methyl, ethyl, $NHCOR_{37}$, $NHCOOR_{37}$, $NHCONHR_{37}$, $NHCONR_{36}R_{37}$ or phenyl which is unsubstituted or substituted by OH or $NH_2$, most preferred $NH_2$, OH, hydrogen, methyl, $NHCOR_{37}$ or phenyl which is unsubstituted or substituted by $NH_2$, wherein $R_{36}$ is $C_1$-$C_4$alkyl; phenyl which is unsubstituted or substituted by halogen, $C_1$-$C_4$alkyl or $C_1$-$C_4$-alkoxy, $COR_{37}$, $COOR_{37}$ or $CONHR_{37}$; and $R_{37}$ is $C_1$-$C_4$alkyl or phenyl which is unsubstituted or substituted by halogen, $C_1$-$C_4$alkyl or $C_1$-$C_4$-alkoxy, preferably $C_1$-$C_4$alkyl or phenyl which is unsubstituted or substituted by chloro, methyl, ethyl, methoxy or ethoxy, most preferred methyl, ethyl or phenyl, with the proviso that at least two of the radicals $R_{32}$, $R_{33}$, $R_{34}$ and $R_{35}$ are $NH_2$ or OH, most preferred wherein $R_{32}$ and $R_{35}$ are identical, and $R_{33}$ and $R_{34}$ are identical and at least one of the pairs $R_{32}$ and $R_{35}$ or $R_{33}$ and $R_{34}$ is $NH_2$ or OH;

isoindolines of formula

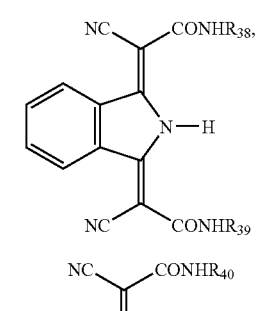

(VI)

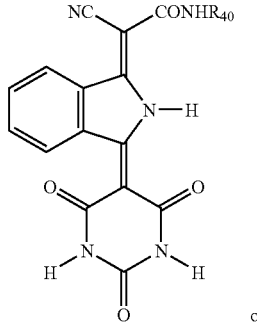

(VII)

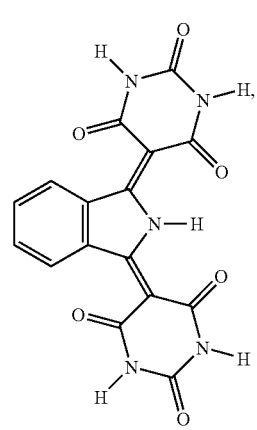

(VIII)

wherein $R_{38}$ is a group

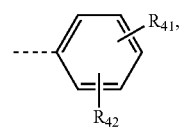

$R_{39}$ is hydrogen, $C_1$-$C_6$alkyl, benzyl or a group

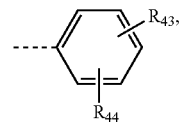

$R_{40}$ is hydrogen or $R_{38}$, and $R_{41}$, $R_{42}$, $R_{43}$ and $R_{44}$ are each independently of the others hydrogen, $C_1$-$C_6$alkyl, $C_1$-$C_6$alkoxy, halogen or trifluoromethyl;

isoindolinones of formula

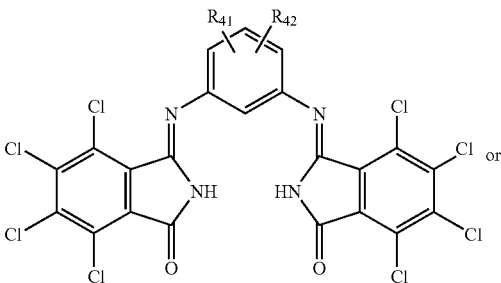

(IX)

or

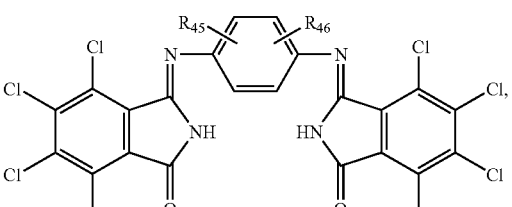

(X)

wherein $R_{45}$ and $R_{46}$ are each independently of the other hydrogen, halogen or $C_1$-$C_6$alkyl;

and mixtures of two or more compounds of formulae (II), (III), (IV), (V), (VI), (VII), (VIII), (IX) and/or (X).

Preferably, one or more of $R_{20}$, $R_{21}$, $R_{22}$, $R_{23}$ and $R_{24}$ is COOH, $COO^{-+}M_1$, $SO_3H$ or $SO_3^{-+}M_1$, particularly in combination with at least one of $R_{16}$, $R_{17}$ and $R_{18}$ being hydrogen, thus forming a betaine or sulfobetaine salt, respectively.

Preferably, $M_1^+$ is $Li^+$, ½ $Ca^{2+}$, ½ $Sr^{2+}$, ½ $Ba^{2+}$, ½ $Mn^{2+}$, ½ $Mg^{2+}$ or ½ $Zn^{2+}$.

Of particular preference are the pigments of the formulae
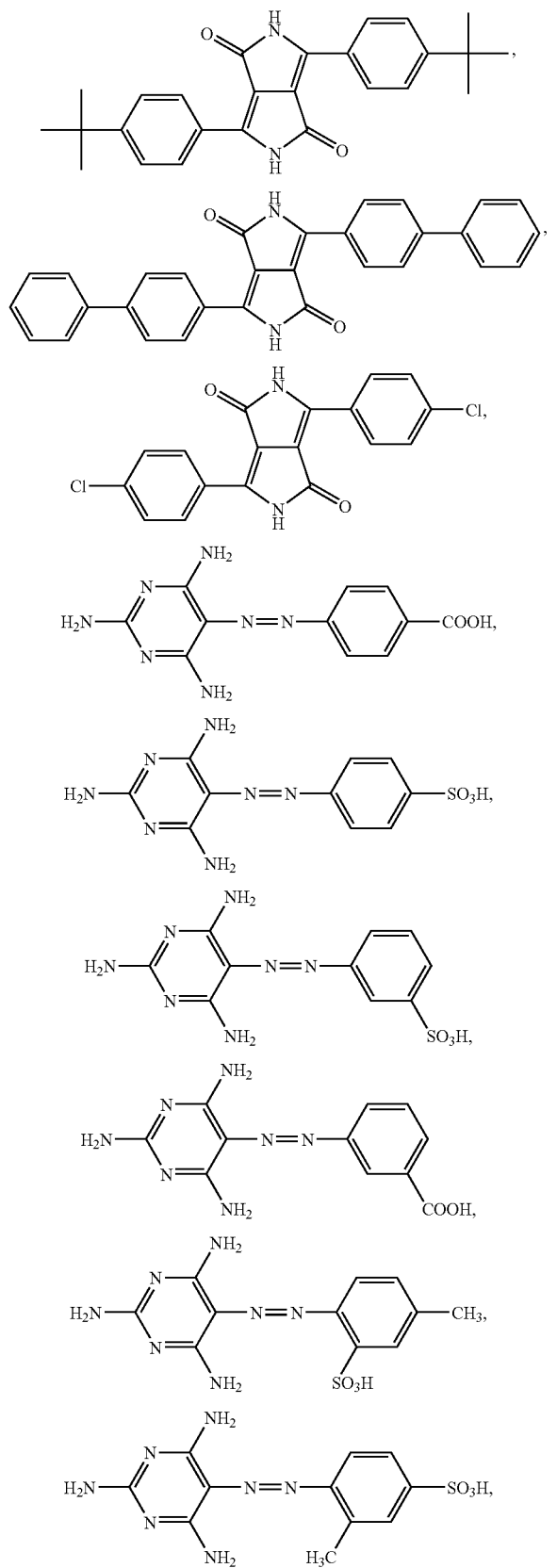
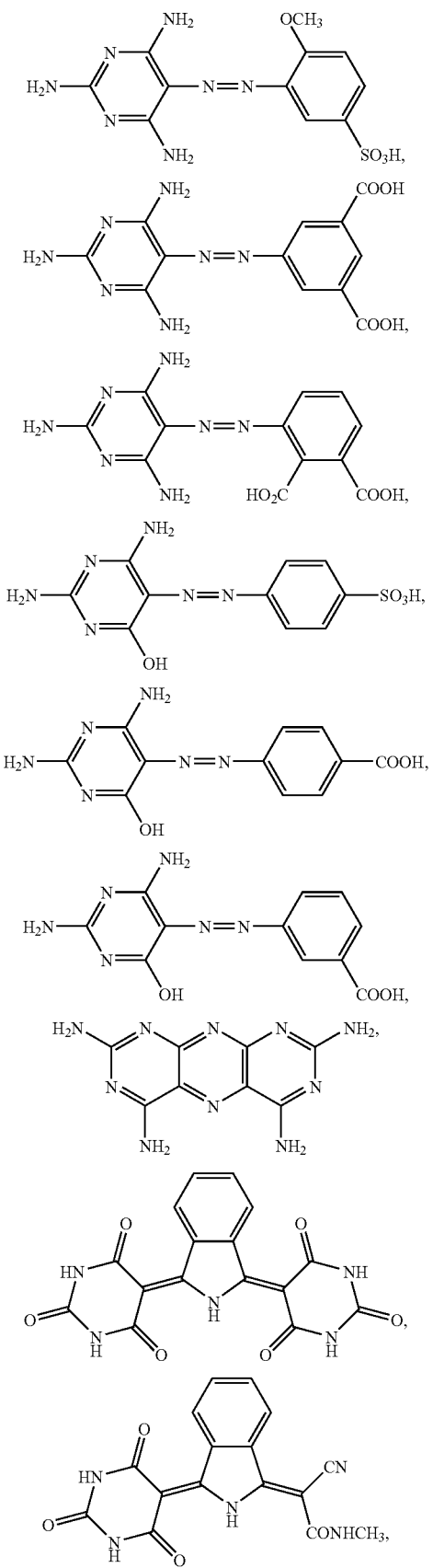

-continued

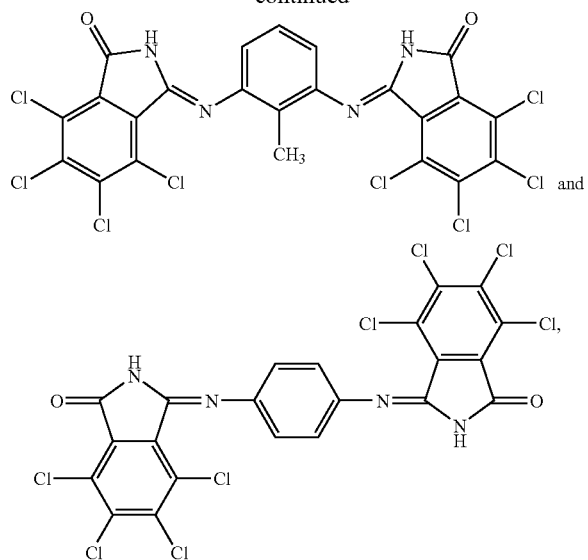

as well as the M⁺ salts of

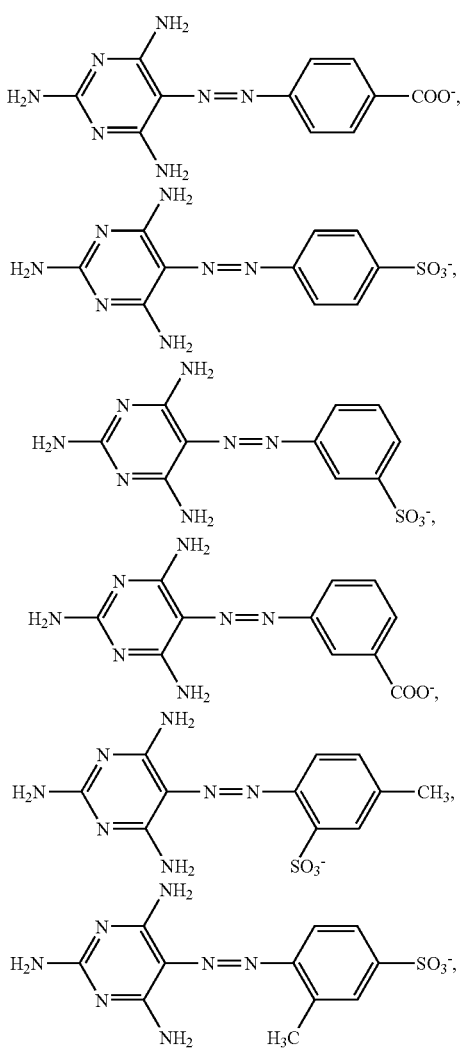

-continued

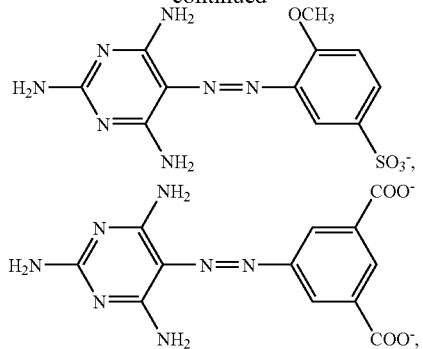

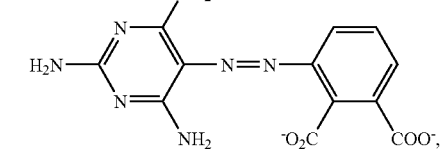

Halogen is typically fluoro, bromo or chloro, preferably bromo or especially chloro on aryl or heteroaryl, and fluoro on alkyl.

$C_1$-$C_{12}$Alkyl is typically methyl, ethyl, n-propyl, isopropyl, n-butyl, sec-butyl, isobutyl, tert-butyl, n-pentyl, 2-pentyl, 3-pentyl, 2,2-dimethylpropyl, n-hexyl, n-octyl, 1,1,3,3-tetramethylbutyl, 2-ethylhexyl, nonyl, decyl or dodecyl. $C_3$-$C_{12}$Cycloalkyl is, for example, cyclopropyl, cyclobutyl, cyclopentyl, cyclohexyl, trimethylcyclohexyl, menthyl, thujyl, bornyl, 1-adamantyl or 2-adamantyl.

$C_2$-$C_{12}$Alkenyl or $C_3$-$C_{12}$cycloalkenyl is respectively $C_2$-$C_{12}$alkyl or $C_3$-$C_{12}$cycloalkyl that is mono- or poly-unsaturated, wherein two or more double bonds may be isolated or conjugated, for example vinyl, allyl, 2-propen-2-yl, 2-buten-1-yl, 3-buten-1-yl, 1,3-butadien-2-yl, 2-cyclobuten-1-yl, 2-penten-1-yl, 3-penten-2-yl, 2-methyl-1-buten-3-yl, 2-methyl-3-buten-2-yl, 3-methyl-2-buten-1-yl, 1,4-pentadien-3-yl, 2-cyclopenten-1-yl, 2-cyclohexen-1-yl, 3-cyclohexen-1-yl, 2,4-cyclohexadien-1-yl, 1-p-menthen-8-yl, 4(10)-thujen-10-yl, 2-norbornen-1-yl, 2,5-norbornadien-1-yl, 7,7-dimethyl-2,4-norcaradien-3-yl or the various isomers of hexenyl, octenyl, nonenyl, decenyl or dodecenyl.

The pigments preferably have a specific surface area of from 10 to 150 m²/g. Special preference is given to opaque pigments having a specific surface area of from 12 to 50 m²/g and to transparent pigments having a specific surface area of from 50 to 100 m²/g.

The instant pigment compositions are suitably prepared by dispersing the pigment and the prepolymer in an inert liquid medium, such as an organic solvent or preferably water, then crosslinking the prepolymer by addition of a crosslinking agent, addition of a crosslinking catalyst and/or heating. The instant pigment compositions are then preferably isolated by filtration and dried.

Alternatively, it is also possible to isolate and optionally dry the dispersion of pigment in the prepolymer, optionally also comprising a thermally crosslinking agent, and then only to perform crosslinking by heating.

Crosslinking, or optionally the final part of crosslinking, can also be effected upon final processing of the engineering plastic to be coloured.

The pigment and the prepolymer can be dispersed together, or the pigment can be dispersed in a dispersion or solution of the prepolymer, or the prepolymer can be dispersed or dissolved in a dispersion of the pigment, or the prepolymer can be prepared by emulsion or suspension polymerisation in presence of the pigment, for example by adding the pigment to the polymerisable monomer or mixture of monomers before the subsequent polymerisation reaction.

The present invention also relates to a method of producing a coloured engineering plastic, wherein an engineering plastic and a tinctorially effective amount of at least one pigment composition according to the invention are processed together at a temperature of 200° C. or above, preferably from 220 to 350° C., most preferred from 240 to 330° C.

Generally, the amount of instant pigment composition will be from 0.001 to 70% by weight, based on the total weight of the engineering plastic and instant pigment composition. Preferred are in the case of coloured items from 0.01 to 10% by weight, and in the case of masterbatches from 30 to 60% by weight, each based on the total weight of the engineering plastic and instant pigment composition. The engineering plastics to be colored with the instant pigment compositions are generally polymers having a molecular weight in the range of from $10^4$ to $10^8$ g/mol.

Colouring the engineering plastics with the pigment composition according to the invention is carried out, for example, by mixing such a pigment composition into the substrates using roll mills or mixing or grinding apparatuses, as a result of which the pigment composition is finely distributed in the engineering plastic. The high engineering plastic comprising the admixed pigment composition is then processed by methods known per se, such as calendering, compression moulding, extrusion, spread-coating, melt-spinning, casting or by injection moulding, whereby the coloured material acquires its final shape. Admixture of the pigment composition can also be effected immediately prior to the actual processing step, for example by continuously feeding a solid, for example pulverulent, pigment composition and, at the same time, a granulated or powdered engineering plastic, and optionally also additional ingredients such as, for example, additives, directly into the intake zone of the processing equipment, where mixing takes place immediately before processing. Crosslinking may also be effected or completed at this stage. Generally, however, it is preferable to mix the pigment composition into the engineering plastic beforehand, since more uniformly coloured products can be achieved.

Remarkably, the instant pigment compositions largely retain their structure upon processing, so that the instant crosslinked polymer remains around the pigments, thus preventing a direct contact between the pigment and the engineering plastic. The instant pigment compositions also have an excellent compatibility with engineering plastics.

In order to produce non-rigid mouldings or to reduce their brittleness, it is possible to incorporate so-called plasticisers into the engineering plastics prior to shaping. There may be used as plasticisers, for example, esters of phosphoric acid, phthalic acid or sebacic acid. In the method according to the invention, the plasticisers may be incorporated into the polymers before or after incorporation of the colorant. It is also possible, in order to achieve different colour shades, to add to the engineering plastics, in addition to the pigment composition according to the invention, further pigments or other colorants in any desired amounts, optionally together with further additional ingredients such as, for example, fillers or siccatives (drying agents). On the other hand, it is sometimes desirable to increase the rigidity and/or solidity, for example by incorporating glass fibers or other known reinforcing agents.

Preferred engineering plastics suitable for colouring in accordance with the invention are very generally polymers having a dielectric constant 2.5 at 20° C., preferably polyester (e.g. PET), polycarbonate (PC), polystyrene (PS), polymethyl methacrylate (PMMA), polyamide, polyethylene, polypropylene, styrene/acrylonitrile (SAN) or acrylonitrile/butadiene/styrene (ABS).

Special preference is given to polyester and very special preference is given to polyamide, for example polyamide 6, polyamide 6.6, polyamide 12 and aramid.

The pigment compositions according to the invention are well dispersible in the afore-mentioned materials, especially polyamides, and provide them with strongly coloured, level hues and in-use fastness properties, especially thermal stability, lightfastness, migration fastness and washing fastness, without fluorescence and deterioration of the mechanical properties.

The examples which follow illustrate the invention, without limiting it (parts and "%" are by weight where not otherwise specified). The relation between parts by weight and parts by volume is the same as that between g and cm³.

EXAMPLE 1

28.5 g of a 35.2% Wet Press Cake of the Pigment of Formula

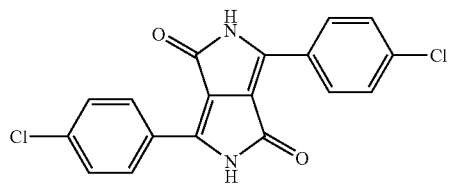 [SMILES: O=C1NC(c2ccc(Cl)cc2)=C2C(=O)NC(c3ccc(Cl)cc3)=C12]

are dispersed into 200 ml of water. 40 g of Acronal® S 760 (50±1% solids, BASF) are added thereto, and the suspension is stirred for 2 hours. The polymer is then precipitated by the addition of HCl, and the solids are filtered and dried at 60° C./$10^4$ Pa.

EXAMPLE 2

18.2 g of a 55% Wet Press Cake of the Pigment of Formula

are dispersed into 250 ml of water containing 20 g of Acronal® LR 8977 (50±1% solids, BASF). The polymer is then precipitated by the addition of HCl, and the solids are filtered and dried at 60° C./$10^4$ Pa.

EXAMPLE 3

23.7 g of a 42.2% Wet Press Cake of the Pigment of Formula

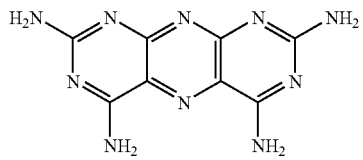 [SMILES: Nc1nc(N)c2nc3c(N)nc(N)nc3nc2n1]

are dispersed into 250 ml of water containing 23.8 g of Glascol® C44 (~40% solids, CIBA Specialty Chemicals Inc.). The polymer is then precipitated with HCl and the yellow suspension is heated for 18 hours at 100° C. Filtration and drying at 50° C./$10^4$ Pa yields 20 g of yellow granules.

EXAMPLES 4-6

Test plates made of polyamide 6 (Ultramid® B3K, BASF) containing 0.2% of the encapsulated pigments according to examples 1-3 are prepared by injection molding from a preconcentrate compounded in a twin-screw extruder. The processing temperatures are between 240 and 300° C. So produced test plates show excellent temperature and light stability, as well as excellent wash stability, no migration of the colorants and no fluorescence.

The invention claimed is:

1. A method of producing a colored polyamide engineering plastic comprising a) preparing a pigment composition by mixing an organic pigment and a prepolymer in a liquid medium; and b) coloring a polyamide engineer plastic by processing together the pigment composition from a) and the polyamide engineering plastic at a temperature of about 220 to 350 ° C.;
   wherein the pigment composition comprises solid particles, which particles comprise from 20 to 75% by weight of an organic pigment and from 80 to 25% by weight of a crosslinked polymer, each based on the total weight of the solid particles,
   wherein the prepolymer has average molecular weight $M_w$ from 2000 to 200000, which prepolymer comprises (a) repeating blocks of formula

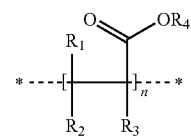

and (b1) hydroxy, epoxy or primary or secondary amino groups or (b2) unsaturated bonds, wherein $R_1$ is H, $C_1$-$C_4$alkyl, $C_2$-$C_4$alkenyl or $COOR_5$, $R_2$ and $R_3$ are independently from one another H, $OR_6$, $NHR_6$, $C_1$-$C_4$alkyl or $C_2$-$C_4$alkenyl, $R_4$, $R_5$ and $R_6$ are independently from one another H, unsubstituted $C_1$-$C_6$alkyl or $C_2$-$C_6$alkenyl, or $C_2$-$C_6$alkyl or $C_2$-$C_6$alkenyl each substituted by one or more hydroxy and/or epoxy groups, and n is a number from 2 to 2000;

wherein the organic pigment is selected from the group consisting of pyrrolo[3,4-c]pyrroles of the formula

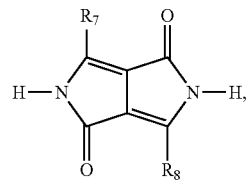

wherein $R_7$ and $R_8$ are each independently of the other a group of formula

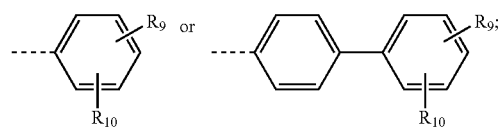

$R_9$ and $R_{10}$ are each independently of the other hydrogen, halogen, $C_1$-$C_{24}$alkyl, trifluoromethyl, $C_5$-$C_6$cycloalkyl, $C_1$-$C_{18}$alkoxy, $C_1$-$C_{18}$alkylthio, $C_1$-$C_{18}$alkylamino, cyano, carbamoyl, nitro, phenyl, C=N—$C_1$-$C_{24}$alkyl

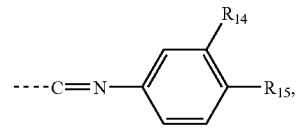

imidazolyl, pyrazolyl, triazolyl, piperazinyl, pyrrolyl, oxazolyl, benzoxazolyl, benzothiazolyl, benzimidazolyl, morpholinyl, piperidinyl or pyrrolidinyl, preferably hydrogen, halogen, cyano, carbamoyl, nitro, trifluoromethyl, phenyl, $C_1$-$C_6$alkyl, $C_1$-$C_6$alkylthio or $C_1$-$C_6$alkylamino;

$R_{11}$ and $R_{12}$ are each independently of the other hydrogen, halogen or $C_1$-$C_6$alkyl;

$R_{13}$ is —$CH_2$—, —$CH(CH_3)$—, —$C(CH_3)_2$—, —CH=N—, —N=N—, —O—, —S—, —SO—, —$SO_2$—NH or —$NC_1$-$C_6$alkyl-; and $R_{14}$ and $R_{15}$ are each independently of the other hydrogen, halogen, $C_1$-$C_6$alkyl, $C_1$-$C_6$alkoxy or CN; pyrimidopteridines of formula

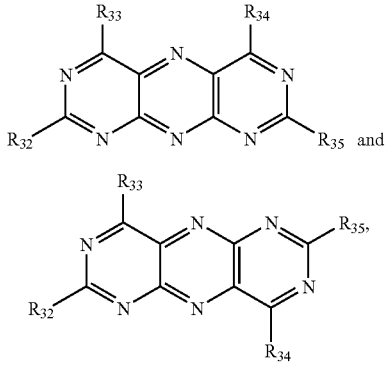

(IV)

and (V)

wherein $R_{32}$, $R_{33}$, $R_{34}$ and $R_{35}$ are each independently of one another $NH_2$, OH, hydrogen, methyl, ethyl, $NHCOR_{37}$, $NHCOOR_{37}$, $NHCONHR_{37}$, $NHCONR_{36}R_{37}$ or phenyl which is unsubstituted or substituted by OH or $NH_2$, wherein $R_{36}$ is $C_1$-$C_4$alkyl; phenyl which is unsubstituted or substituted by halogen, $C_1$-$C_4$alkyl or $C_1$-$C_4$-alkoxy, $COR_{37}$, $COOR_{37}$ or $CONHR_{37}$; and $R_{37}$ is $C_1$-$C_4$alkyl or phenyl which is unsubstituted or substituted by chloro, methyl, ethyl, methoxy or ethoxy, with the proviso that $R_{32}$ and $R_{35}$ are identical, and $R_{33}$ and $R_{34}$ are identical and at least one of the pairs $R_{32}$ and $R_{35}$ or $R_{33}$ and $R_{34}$ is $NH_2$ or OH;

2. The method according to claim 1, wherein the prepolymer is selected from the group consisting of homo- or copolymers based on unsaturated monomers selected from the group consisting of acrylic acid, methacrylic acid, maleic acid, esters of acrylic acid, methacrylic acid and maleic acid, amides of acrylic acid, methacrylic acid and maleic acid and maleic acid anhydride, which monomers may be copolymerized with less polar monomers and comprises at least 30% by weight of repeating blocks of formula (I).

3. The method according to claim 1, wherein the amount of crosslinking agent is from 1 to 25% by weight, based on the amount of prepolymer.

4. The method according to claim 1, wherein the pigment particles having a size of from 0.01 to 10 μm.

5. An engineering plastic produced according to claim 1.

6. The method according to claim 1, wherein the organic pigment is pyrrolo[3,4-c]pyrroles of the formula

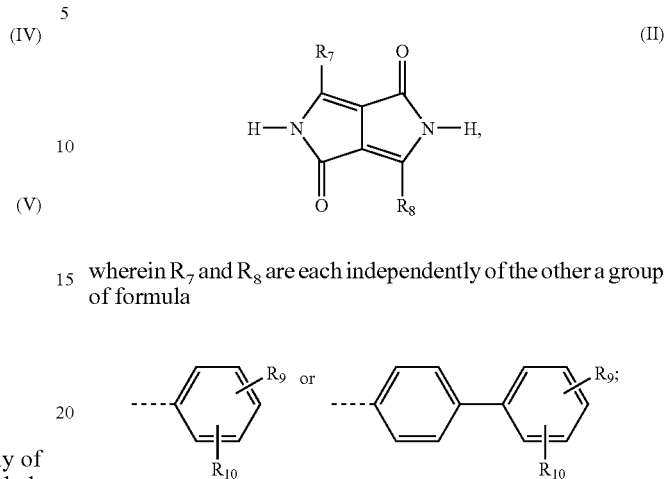

(II)

wherein $R_7$ and $R_8$ are each independently of the other a group of formula $R_9$ and $R_{10}$ are each independently halogen.

7. The method according to claim 1, wherein the organic pigment is pyrimidopteridines of formula

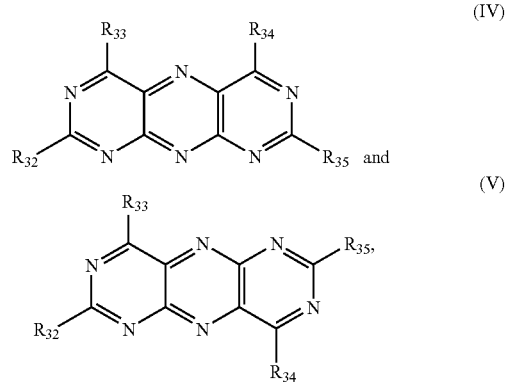

(IV)

and (V)

wherein $R_{32}$, $R_{33}$, $R_{34}$ and $R_{35}$ are each independently of one another $NH_2$.

* * * * *